(12) United States Patent
De Laat et al.

(10) Patent No.: US 8,781,285 B2
(45) Date of Patent: Jul. 15, 2014

(54) MULTIPURPOSE FIBER TERMINATION UNIT

(71) Applicant: Genexis Holding B.V., Eindhoven (NL)

(72) Inventors: Maurice Martinus De Laat, Budel (NL); Pierre Jean Johannes Stassar, Huizen (NL); Gerard Nicolaas Van Den Hoven, Maria Hoop (NL); Johannes Adrianus Petrus Gibbels, Heeswijk-Dinther (NL)

(73) Assignee: Genexis Holding B.V., Eindhoven (NL)

( * ) Notice: Subject to any disclaimer, the term of this patent is extended or adjusted under 35 U.S.C. 154(b) by 46 days.

(21) Appl. No.: 13/678,967

(22) Filed: Nov. 16, 2012

(65) Prior Publication Data
US 2013/0142488 A1 Jun. 6, 2013

(30) Foreign Application Priority Data
Nov. 17, 2011 (NL) .................................... 2007805

(51) Int. Cl.
*G02B 6/00* (2006.01)
(52) U.S. Cl.
USPC .......................................... 385/135; 385/134
(58) Field of Classification Search
CPC .... G02B 6/4446; G02B 6/4441; G02B 6/426; G02B 6/4261
USPC ......................................................... 385/135
See application file for complete search history.

(56) References Cited

U.S. PATENT DOCUMENTS

2005/0094959 A1   5/2005   Sibley et al.

FOREIGN PATENT DOCUMENTS

| CH | 702 444 | 6/2011 |
| EP | 1 626 300 | 2/2006 |

OTHER PUBLICATIONS

Search Report for NL2007805, dated Jul. 10, 2012.
Written Opinion for NL2007805, dated Jul. 10, 2012.
Genexis Flyer, Jan. 2011, 2 pages.

*Primary Examiner* — Omar Rojas
(74) *Attorney, Agent, or Firm* — Nixon & Vanderhye P.C.

(57) ABSTRACT

The NTU receiving structure (14) is further adapted to receive a demountable casing (15) for enclosing a second network termination unit (16). The fiber management unit (11) is further adapted for accommodating the outer end of a second optical fiber with a second optical connector (32). The fiber termination unit (10) further comprises a second NTU connection unit (23) for positioning the second optical connector (32) in a position suitable for connecting the second optical connector (32) to a connector part of the second network termination unit (16) when the demountable casing (15) with the second network termination unit (16) is received in the NTU receiving structure (14).

13 Claims, 8 Drawing Sheets

MULTIPURPOSE FIBER TERMINATION UNIT

FIELD OF THE INVENTION

This invention relates to a fiber termination unit (FTU) for connecting an optical connector at an outer end of an optical fiber to a network termination unit (NTU), the fiber termination unit comprising a fiber management unit with an NTU connection unit and an NTU receiving structure. The fiber management unit is provided for accommodating the outer end of the optical fiber. The NTU connection unit is provided for positioning the optical connector in a position suitable for connecting the optical connector to a connector part of the network termination unit. The NTU receiving structure is adapted to receive the network termination unit in such a way that, when the network termination unit is installed in the NTU receiving structure, the connector part of the network termination unit is positioned opposite to the NTU connection unit in order to enable connecting the optical connector to the connector part of the network termination unit.

This invention further relates to a TV receiver and a patch cord for use with such a fiber termination unit.

BACKGROUND OF THE INVENTION

Such fiber termination units are commonly installed in homes as an end station of an optical fiber network. Optical fiber networks are constructed to make it possible to transport high quantities of data at high speeds and are, e.g., used for offering Internet access, telephony and/or radio and TV services. Originally, optical fibers were mainly used for transporting data between a central main station and distribution stations in the neighborhoods. In the distribution stations, optical signals are converted to electrical signals (and vice versa) and forwarded to users in homes and/or offices. Installation and configuration of the equipment providing this conversion and connecting the equipment to the optical and electrical cables is done by specialized engineers who have been trained for this.

In recent years it has become increasingly usual to bring the optical fibers all the way to the home or office (FttH—Fiber to the Home). A fiber termination unit (FTU) as described above may be attached to the wall, close to where one or more optical fibers enter the home or are planned to enter the home. The optical fiber is then accommodated in the fiber termination unit. The user's telephone, PC, TV or radio cannot be connected to the fiber termination unit directly. If a user wants to use the optical fiber network for a specific data service, a dedicated network termination unit is to be connected to the optical fiber in the fiber termination unit. Different network termination units are used to facilitate for different services.

In a FTU there are means for supporting the incoming ground cable containing the incoming optical fibers. Furthermore the FTU accommodates for a number of optical connectors with fiber pigtails. The incoming optical fibers are to be connected to these fiber pigtails. This requires a trained technician or installer with special skills and equipment, since the fibers are very fragile and alignment accuracy is very strict. The most commonly used technique for connecting the fibers is by fusion splicing. The overlength of the optical fiber is stored in a means for fiber management, which is a subpart of the FTU. The optical connector(s) are placed in such a way that they can connect to a NTU.

Each time a user wants to subscribe to a new service, an engineer may be needed for installing a new network termination unit. Some of these problems have already been solved by previous Genexis inventions for easing the connection of the optical fibers to the fiber and/or network termination units. A currently available fiber termination unit is used in Genexis' CORE product line. The CORE Advanced uses a universal fiber termination unit with two interfaces for connecting a respective incoming optical fiber to a network termination unit. It allows connecting the fiber termination unit to, e.g., a first network termination unit providing a data connection to the Internet and a second network termination unit for receiving media broadcasts (e.g. TV or radio). It is an advantage of this fiber termination unit that it is based on an open interface. The so-called universal fiber termination unit (UFTU) can be combined with network termination units of different network operators or service providers. When a user decides to subscribe to a new service or a different service provider, the corresponding new network termination unit will be compatible with the universal fiber termination unit and can be installed easily. It is, e.g., foreseen that in the near future there may be no need anymore for a TV receiver module for receiving broadcasted TV, making the second optical fiber available for other data services.

Although its flexibility is a very desirable aspect of the universal fiber termination unit, the modular aspect also leads to an important disadvantage, i.e. the size of the unit. A universal fiber termination unit on which the two network termination units can be installed has a width of about 20 cm, which might be too much for being placed unnoted in some corner of the room.

OBJECT OF THE INVENTION

It is an object of the invention to provide a fiber termination unit which is smaller than the known universal fiber termination unit, while maintaining flexibility and compatibility.

SUMMARY OF THE INVENTION

According to a first aspect of the invention, this object is achieved by providing a fiber termination unit according to the opening paragraph, wherein the NTU receiving structure is adapted to receive a demountable casing for enclosing a second network termination unit and the fiber management unit is adapted for accommodating the outer end of a second optical fiber with a second optical connector at its outer end. The fiber termination unit further comprises a second NTU connection unit for positioning the second optical connector in a position suitable for connecting the second optical connector to a connector part of the second network termination unit when the demountable casing with the second network termination unit is received in the NTU receiving structure.

The fiber termination unit according to the invention does not only save space by adding the second NTU connection unit to the fiber management unit and allowing the second network termination unit to be connected to the same fiber management unit as the first network termination unit. The fiber termination unit according to the invention also has the flexibility and modular setup of the known universal fiber termination unit with its two universal standard interfaces. In the exemplary situation described before, when a media broadcast receiver module would become obsolete, the user can easily take the demountable casing out of the fiber termination unit, replace the media broadcast receiver module by a different network termination unit and put the casing back into the fiber termination unit.

It is a big advantage of the fiber termination unit according to the invention that the NTU receiving structure could be adapted to receive a standard sized first network termination unit from any available supplier of network termination units. Only the second network termination unit, which is to be placed in the demountable casing, requires special dimensions in order to fit into the casing in such a way that it can connect to the second NTU connection unit.

If the demountable casing and the NTU receiving structure are designed such that the whole demountable casing is positioned underneath the first network termination unit when the first network termination unit is installed, the dimensions of the fiber termination unit are comparable to the known fiber termination units that can accommodate only one network termination unit. In that way, an additional network termination unit can be used without increasing the size of the fiber termination unit.

When the demountable casing is placed underneath the first network termination unit, an outer surface of the demountable casing may form part of the NTU receiving structure for receiving the first network termination unit. This would enable the first network termination unit to be installed directly on top of the outer surface of the demountable casing.

In advantageous embodiments of the fiber termination unit according to the invention, the demountable casing and the NTU receiving structure are designed such that the demountable casing can be demounted and remounted with the first network termination unit already installed. This would make it even easier to install new or additional network termination units.

Optionally, the fiber management unit is demountable from the fiber termination unit. Traditionally, the fiber management unit is an integrated part of the fiber termination unit. In this embodiment of the invention, the fiber management unit is a separate subpart of the fiber termination unit. This embodiment has the advantage that the installation of the installation does not have to take place in the exact same place as where the ground cable comes into the house and where the fiber termination unit is fixed to the wall. As described above, the actual fiber installation requires special skills and equipment. The fiber installation gets easier when there is more space to perform i.e. the fiber splicing and placing (or rolling) of the fibers in the fiber management unit.

Instead of housing a media broadcast receiver, the demountable casing could, e.g., also comprise an optical patch cord making it possible to connect a further external module or a second fiber termination unit to the first one. With a second fiber termination unit connected to the first fiber termination unit, it may, for example, be possible to use two standard sized network termination units simultaneously.

According to a second aspect of the invention, a TV receiver is provided for use in a fiber termination unit as described above, the TV receiver comprising a connector part and being adapted to be received in the demountable casing, the connector part being adapted to be connected to the second optical connector.

According to a third aspect of the invention, an optical patch cord is provided, comprising an optical patch cord for use in a fiber termination unit as described above, the optical patch cord being adapted to be received in the demountable casing, the optical patch cable being adapted to be connected to the second optical connector.

These and other aspects of the invention are apparent from and will be elucidated with reference to the embodiments described hereinafter.

DETAILED DESCRIPTION OF THE INVENTION

Figure 1:
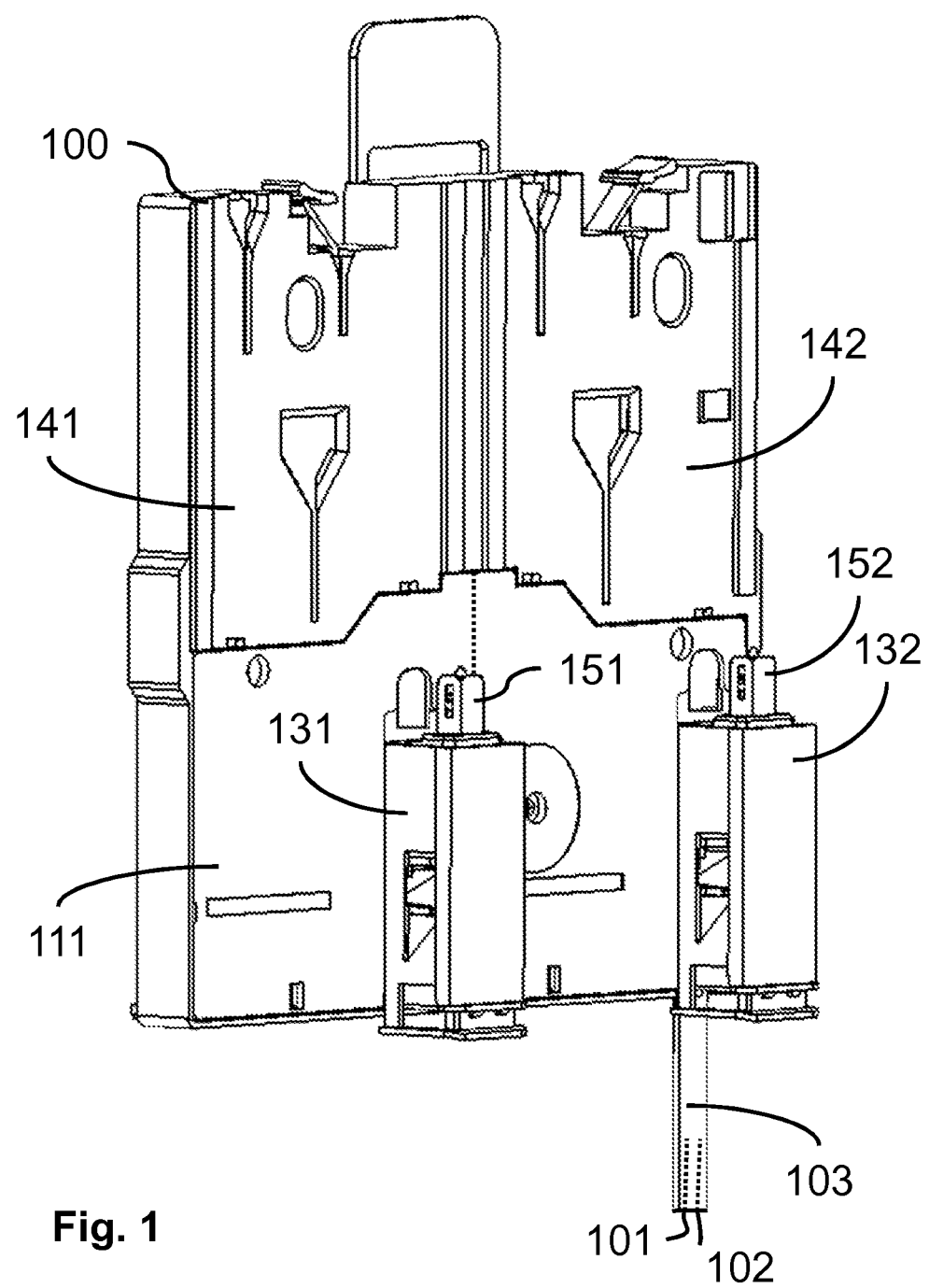
FIG. 1 shows a known universal fiber termination unit.

FIG. 1 shows a known universal fiber termination unit 100. The fiber termination unit of FIG. 1 comprises two interfaces 141, 142 for connecting a respective incoming optical fiber to a network termination unit (not shown). It allows connecting the fiber termination unit to 100, e.g., a first network termination unit providing a data connection to the Internet and a second network termination unit for receiving media broadcasts (e.g. TV or radio). It is an advantage of this fiber termination unit 100 that it is based on a standard interface. The so-called universal fiber termination unit (UFTU) 100 can be combined with network termination units of different service providers. When a user decides to subscribe to a new service or a different service provider, the corresponding new network termination unit will be compatible with the universal fiber termination unit 100 and can be installed easily.

The fiber termination unit 100 has an input for receiving a cable 103 comprising two optical fibers 101, 102. The incoming optical fibers 101, 102 are led to a fiber management unit 111. The fiber management unit 111 serves to roll up and contain an excess length of the optical fibers 101, 102. It also accommodates splices to connect the optical fibers 101, 102 and fiber pigtails containing two optical connectors 151, 152. The two optical connectors 151, 152 are installed in two respective NTU connection units 131, 132. The fiber termination unit 100 is designed to be able to receive two separate network termination units at respective NTU receiving structures 141, 142 situated at the left and right half of the fiber termination unit 100. When a network termination unit is installed on, e.g., the first NTU receiving structure 141, the network termination unit is slid over the respective NTU connection unit 131 and connected to the first optical fiber 101 via the optical connector 151.

The fiber termination unit 100 of FIG. 1 can receive two standard sized network termination units. For example, one network termination unit for connecting to the Internet and one for connecting to a TV broadcast network.

Figure 2:
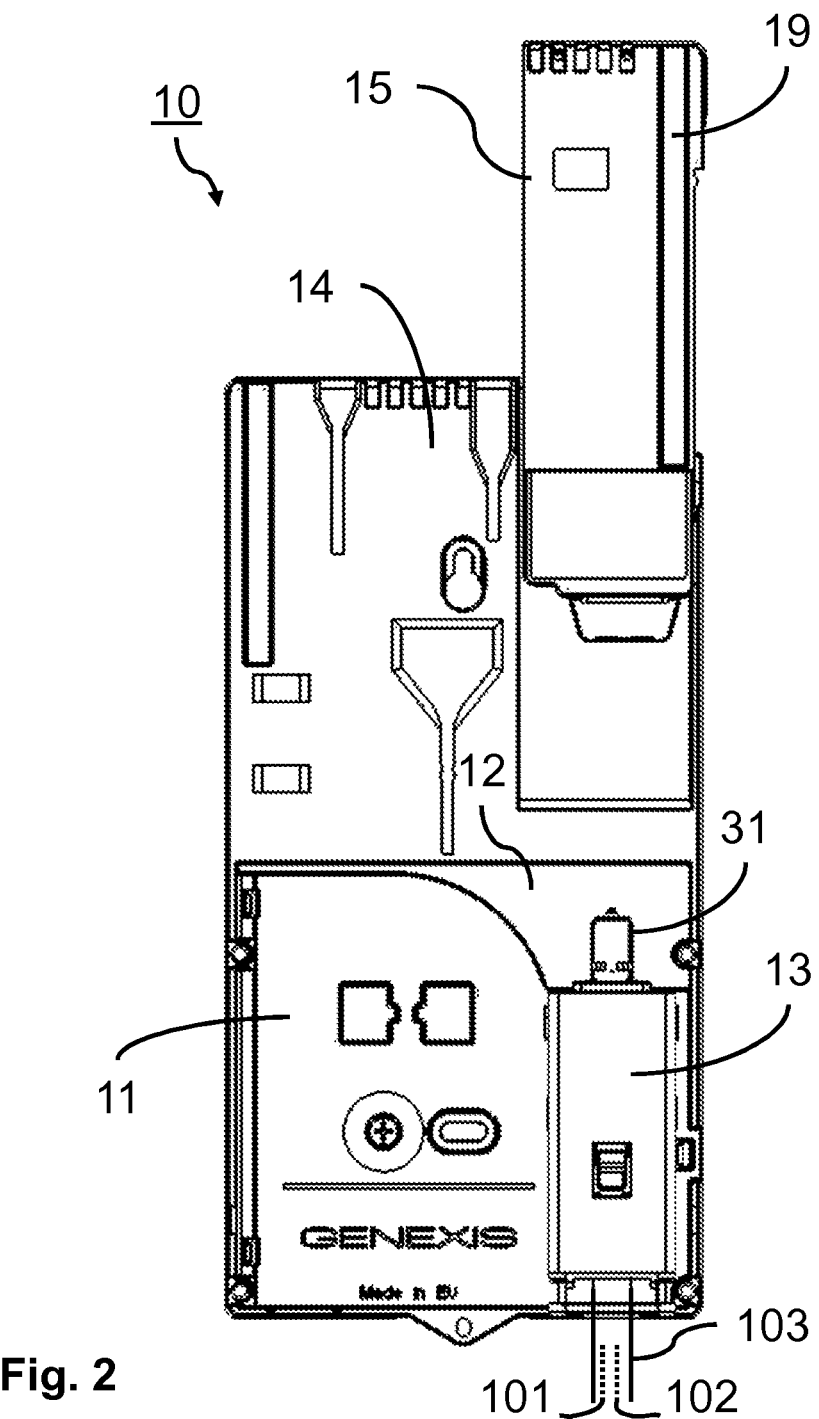
FIG. 2 shows a fiber termination unit according to the invention.

FIG. 2 shows a fiber termination unit 10 according to the invention. This fiber termination unit 10 can also receive a first standard sized network termination unit at the NTU receiving structure 14. The first incoming optical fiber 101 is led to fiber management unit 11. A carrier plate 12 of the fiber management unit 11 serves to roll up and contain an excess length of the optical fiber 101. The carrier plate 12 also accommodates a splice to connect the optical fiber 101 and a fiber pigtail containing an optical connector 31. The optical connector 31 is installed in NTU connection unit 13. The fiber termination unit 10 is designed to be able to receive a standard sized network termination unit at NTU receiving structure 14. When such a network termination unit is installed, it is slid over the NTU connection unit 13 and connected to the first optical fiber 101 via the first optical connector 31.

In addition to the first standardized network termination unit, the NTU receiving structure 14 according to the invention can also receive a second network termination unit in a demountable casing 15 that fits into the NTU receiving structure 14. The NTU receiving structure 14 is designed such that the casing 15 can be demounted and remounted, even when the first network termination is already installed. The casing 15 is designed to receive a second network termination unit. When the second network termination unit, e.g. a TV broadcast receiver, is inserted into the casing 15 and the casing 15 is inserted into the NTU receiving structure 14, the second optical fiber 102 is connected to the second network termination unit via a second optical connector (not visible in FIG. 2). In this exemplary embodiment, the upper surface of the demountable casing 15 comprises a ridge 19 being part of the NTU receiving structure 14 for the first network termination unit.

Figure 3:
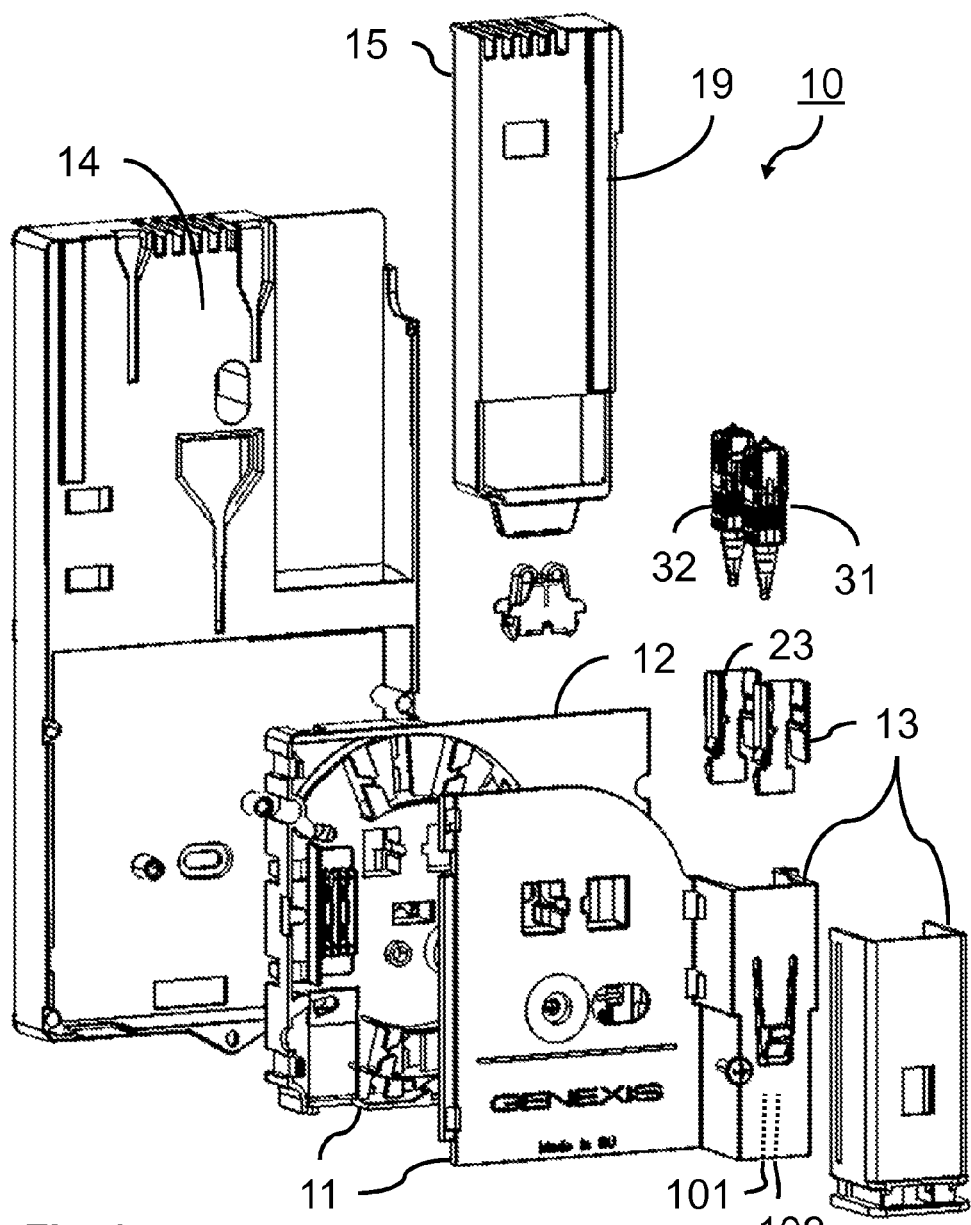
FIG. 3 shows an exploded view of a fiber termination unit according to the invention.

FIG. 3 shows an exploded view of a fiber termination 10 unit according to the invention. In this view it can be seen that the fiber management unit 11 comprises a carrier plate 12 with a structure for receiving a rolled up section of the optical fibers 101, 102. Both optical fibers 101, 102 may be received at the same side of the carrier plate 12 or a second structure for receiving a rolled up section of optical fiber 102 may be provided at the bottom side of the carrier plate 12. The complete fiber management unit 11 can preferably be taken out of the fiber termination unit 10 to ease the installation of the optical fibers 101, 102. The fiber management unit 11 comprises two NTU connection units 13, 23 with respective optical connectors 31, 32 for connecting the optical fibers 101, 102 to the network termination units. When the casing 15 with the second network termination unit is inserted into the NTU receiving structure 14, the second optical fiber 102 is connected to the second optical connector 32.

Figure 4:
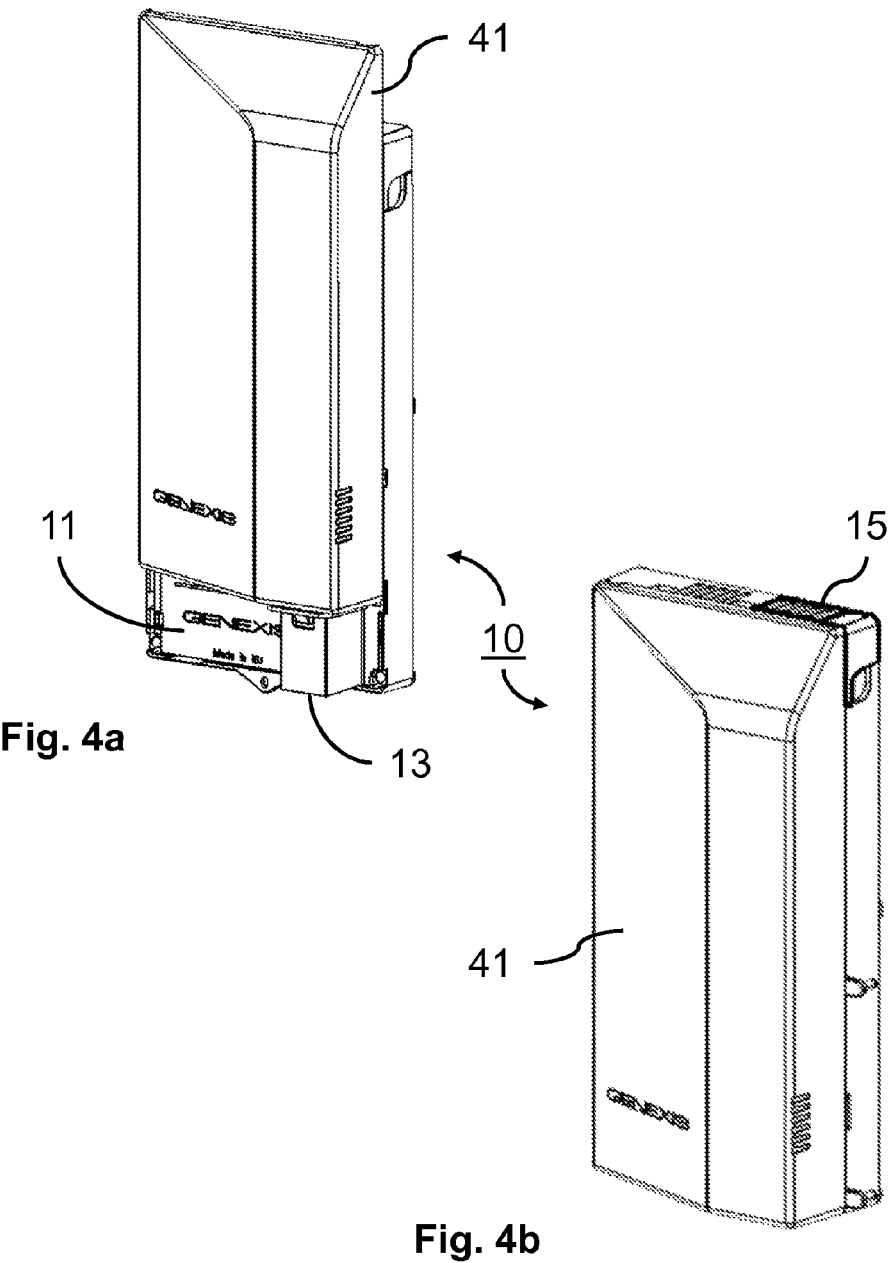
FIG. 4a shows a first network termination unit being installed on the fiber termination unit.
FIG. 4b shows a first network termination unit having been installed on the fiber termination unit.

FIG. 4a shows a first network termination unit 41 being installed on the fiber termination unit 10. The network termination unit 41 has standard dimensions and is slid over the NTU connection unit 13 to be received by the NTU receiving structure 14. FIG. 4b shows the first network termination unit 41 after installation on the fiber termination unit 10. In this embodiment, the demountable casing 15 and the NTU receiving structure 14 are designed such that the whole demountable casing 15, after installation, is provided underneath the installed first network termination unit 41. Thus without increasing the size of the fiber termination unit 10, it is made possible to add a second network termination unit in the demountable casing 15. Although the first network termination unit 41 is already in place, it may still be possible to take out the demountable casing 15, put a second network termination unit into the casing 15 and put the casing back into the NTU receiving structure 14. Gripping means or some mechanical release mechanism (not shown) may be provided at the casing 15 to facilitate gripping the casing 15 when it is inserted into the NTU receiving structure 14.

Figure 5:
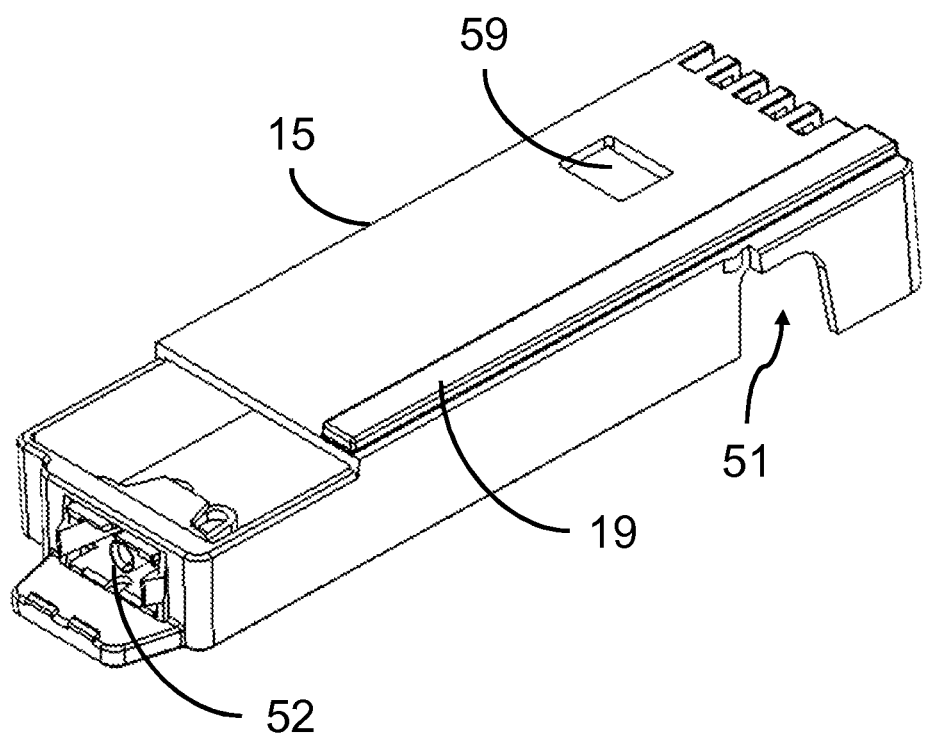
FIG. 5 shows a demountable casing for use in the fiber termination unit.

FIG. 5 shows a demountable casing 15 for use in the fiber termination unit 10. The casing comprises a hole for accommodating the coupling of the optical connector 32 of the second NTU connection unit 23 to an optical input of the network termination unit to be installed in the casing 15. In FIG. 5, a dust cap 52 is placed in the demountable casing to make sure the fiber tip of the optical connector 32 remains clean. Furthermore, the casing 15 comprises a connector hole 51 for coupling further cables or devices to the second network termination unit. These further cables or devices may, e.g., be coupled optically or electrically and may serve to power the second network termination unit or establish an electrical data-connection to enable, for example, control of the operation of the network termination unit. The electrical coupling to, e.g., a power source or control circuit may be separated from the power and control connections of the first network termination unit. In a special embodiment, connections to a power source and/or a control unit are provided through the first network termination unit. Because the second network termination unit is installed on top of the first network termination unit, e.g., spring contacts 69 or sliding contacts may couple both network termination units in such a way that the second network termination unit is powered and controlled via the first network termination unit. An advantage of such an architecture is that no complex additional wiring is needed to provide power and/or control lines for the second network termination unit. The casing 15 further comprises a connector hole 59 for electrical coupling between the first network termination unit and the second network termination unit.

Figure 6A:
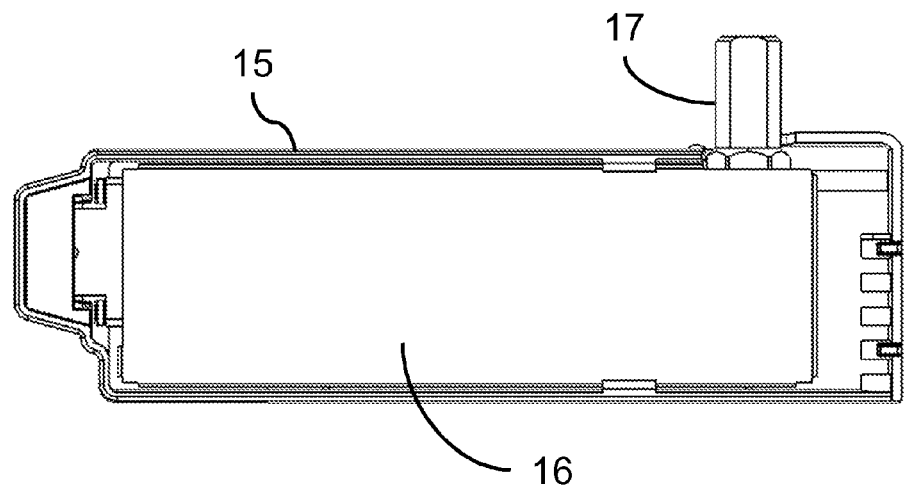
FIG. 6a shows a bottom view of the demountable case with a TV receiver.
Figure 6B:
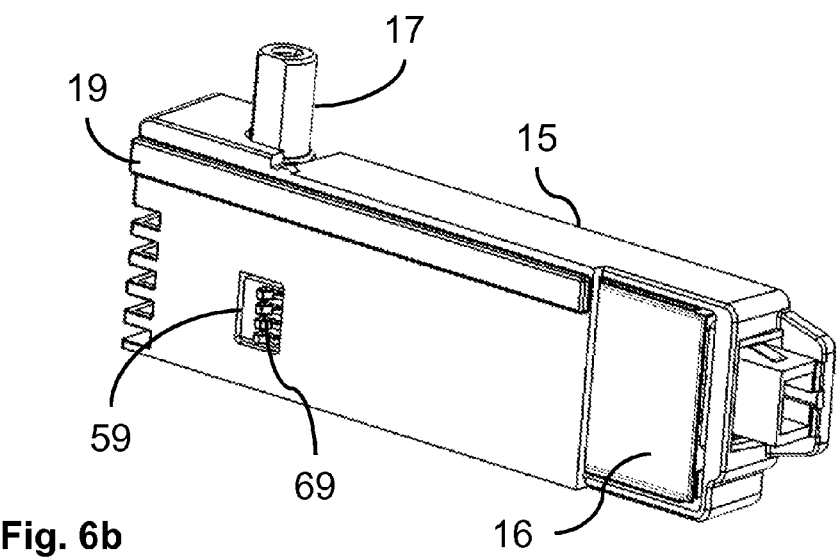
FIG. 6b shows a perspective view of the demountable case with the TV receiver.

FIG. 6a shows a bottom view of the demountable case 15 with a TV receiver 16 installed. A coax connector 17 protrudes through the connector hole 51 of the casing 15. When the casing 15 and the TV-receiver 16 are inserted into the NTU receiving structure 14, the TV-receiver 16 is connected to the second optical connector 32 and the coax connector 17 is available for connection to, e.g. a TV or set top box. FIG. 6b shows a perspective view of the demountable case 15 with the TV receiver 16. The fiber termination unit 10 may be designed such that the demountable case 15 with the second network termination unit 16 has to be inserted before the first network termination unit 41 is attached to the NTU receiving structure 14. Alternatively, the demountable case 15 can also be attached when the first network termination unit is already in place.

Instead of a TV-receiver unit 16 or another type of network termination unit, the casing may also comprise an optical patch cord for extending the optical fiber 102 and providing an external optical connector at the connector hole 51 of the casing. This external optical connector could, e.g., be used for coupling to a second fiber termination unit 10.

Figure 7:
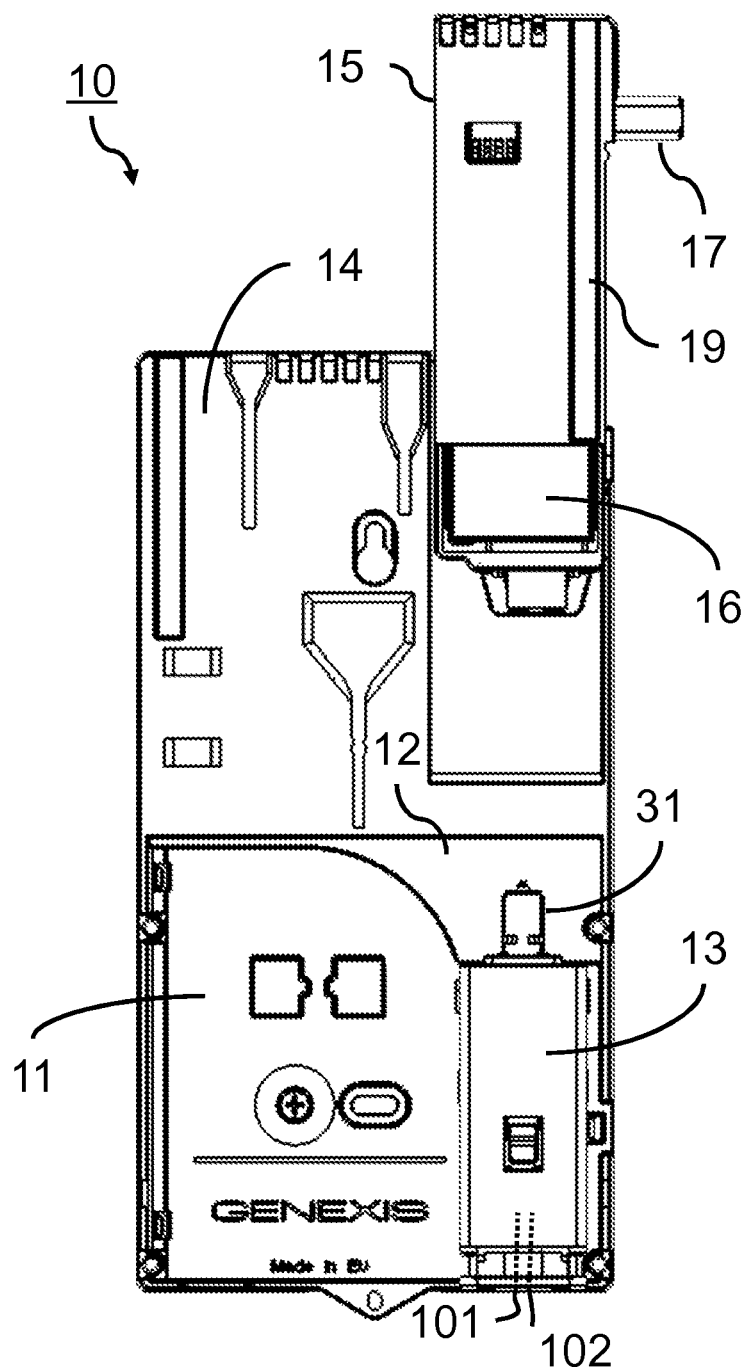
FIG. 7 shows the fiber termination unit according to the invention with a TV receiver being installed or demounted.

FIG. 7 shows the fiber termination unit 10 according to the invention with a TV receiver 16 being installed or demounted. Here the fiber termination unit 10 is shown without the first network termination unit 41 having been installed, but the casing 15 can also be slid into and out of the NTU receiving structure 14 when the first network termination unit 41 has already been installed.

Figure 8:
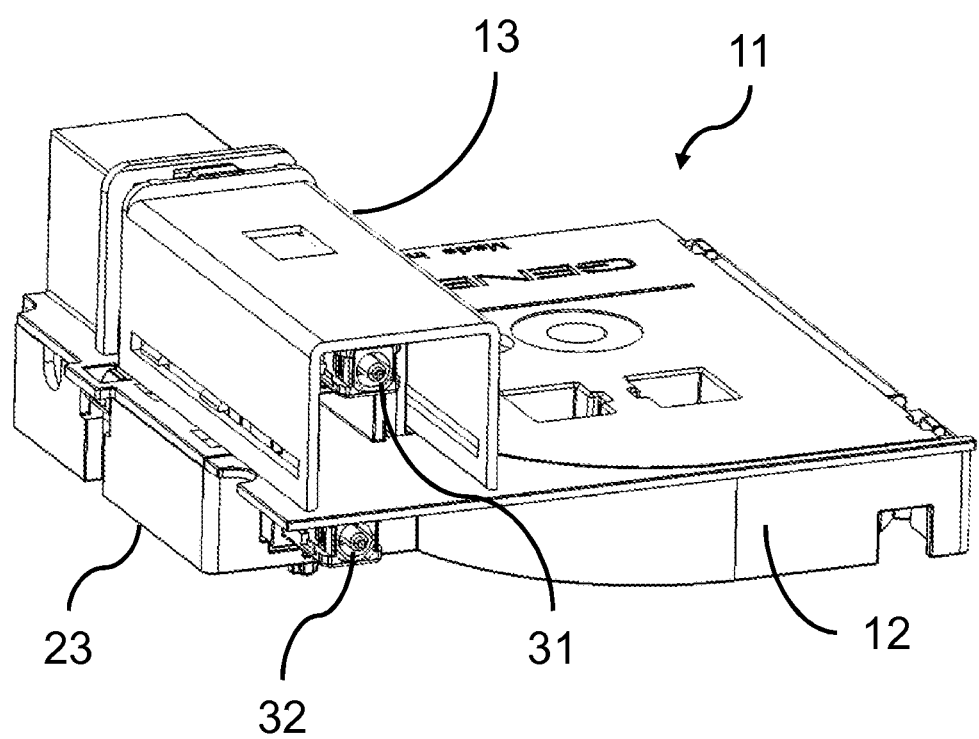
FIG. 8 shows a fiber management unit for use in a fiber termination unit according to the invention.

FIG. 8 shows a fiber management unit 11 for use in a fiber termination unit 10 according to the invention. In this figure, both the first and second NTU connection units 13, 23 and their respective optical connectors 31, 32 are clearly visible. One NTU connection unit 13 is arranged on top of the carrier plate 12 and the other one 23 at the bottom. The upper part of the fiber management unit 11 has dimensions corresponding to the standard dimensions of the first network termination unit 41. The bottom part is designed to couple the second optical connector 32 to the second network termination unit 16.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A fiber termination unit (FTU, 10) for connecting an optical connector (31) at an outer end of an optical fiber to a first network termination unit (NTU, 41), the fiber termination unit (10) comprising:
    a fiber management unit (11) for accommodating the outer end of the optical fiber,
    an NTU connection unit (13), provided at the fiber management unit (11), for positioning the optical connector (31) in a position suitable for connecting the optical connector (31) to a connector part of the first network termination unit (41),
    an NTU receiving structure (14) adapted to receive the first network termination unit (41) in such a way that, when the first network termination unit (41) is installed in the NTU receiving structure (14), the connector part of the first network termination unit (41) is positioned opposite to the NTU connection unit (13) in order to enable connecting the optical connector (31) to the connector part of the first network termination unit (41), characterized in that
    the NTU receiving structure (14) is adapted to receive a demountable casing (15) for enclosing a second network termination unit (16),
    the fiber management unit (11) is adapted for accommodating the outer end of a second optical fiber with a second optical connector (32), and
    the fiber termination unit (10) further comprises a second NTU connection unit (23) for positioning the second optical connector (32) in a position suitable for connecting the second optical connector (32) to a connector part of the second network termination unit (16) when the demountable casing (15) with the second network termination unit (16) is received in the NTU receiving structure (14).

2. A fiber termination unit (FTU, 10) according to claim 1, wherein the NTU receiving structure (14) comprises the demountable casing (15).

3. A fiber termination unit (FTU, 10) according to claim 2, wherein the NTU receiving structure (14) and the demountable casing (15) are designed such that the whole demountable casing (15) is positioned underneath the first network termination unit (41) when the first network termination unit (41) is received by the NTU receiving structure (14).

4. A fiber termination unit (FTU, 10) according to claim 3, wherein an outer surface of the demountable casing (15) is adapted to receive part of the first network termination unit (41).

5. A fiber termination unit (FTU, 10) according to claim 3, wherein the demountable casing (15) comprises the second network termination unit (16).

6. A fiber termination unit (FTU, 10) according to claim 5, wherein the second network termination unit (16) is a TV receiver (16).

7. A fiber termination unit (FTU, 10) according to claim 5, wherein the second network termination unit is an optical patch cord for coupling the second optical connector (32) to an external module.

8. A fiber termination unit (FTU, 10) according to claim 1, wherein the fiber management unit (11) is demountable from the fiber termination unit (10).

9. A fiber termination unit (FTU, 10) according to claim 8, wherein the fiber management unit (11) comprises a carrier plate (12) which is adapted for accommodating the outer end of the first optical fiber at one side and the outer end of the second optical fiber at another side of the carrier plate (12).

10. A fiber termination unit (FTU, 10) according to claim 1, wherein the NTU receiving structure (14) and the demountable casing (15) are designed such that the demountable casing (15) can be demounted and remounted with the first network termination unit (41) installed.

11. A fiber termination unit (FTU, 10) according to claim 5, wherein the second network termination unit (16) and the first network termination unit (41) are electrically connected to each other by spring contacts (69) or sliding contacts for coupling the second network termination unit (16) to a power source or control circuit via the first network termination unit (41).

12. A TV receiver (16) for use in a fiber termination unit (FTU, 10) according to claim 6, the TV receiver (16) comprising a connector part and being adapted to be received in the demountable casing (15), the connector part being adapted to be connected to the second optical connector (32).

13. An optical patch cord unit for use in a fiber termination unit (FTU, 10) according to claim 7, the optical patch cord unit comprising an optical patch cord and a connector part and being adapted to be received in the demountable casing (15), the connector part being adapted to be connected to the second optical connector (32).

* * * * *